United States Patent [19]

Cloutier

[11] Patent Number: 4,471,397
[45] Date of Patent: Sep. 11, 1984

[54] MAGNETIC DISK CARTRIDGE

[75] Inventor: Robert P. Cloutier, Spencerport, N.Y.

[73] Assignee: Eastman Kodak Company, Rochester, N.Y.

[21] Appl. No.: 518,254

[22] Filed: Jul. 28, 1983

[51] Int. Cl.³ ..................... G11B 25/04; G11B 23/02
[52] U.S. Cl. ................................... 360/133; 206/444
[58] Field of Search ........................... 360/133, 97–99, 360/86; 206/444

[56] References Cited

U.S. PATENT DOCUMENTS 4,120,012 10/1978 Bowers ................................ 360/133
4,131,199 12/1978 Hatcheti et al. ................. 360/133 X
4,188,650 2/1980 Rein ..................................... 360/133
4,414,591 11/1983 Wenner ................................ 360/99

FOREIGN PATENT DOCUMENTS 2101390 1/1983 United Kingdom ................ 360/133

Primary Examiner—John H. Wolff
Attorney, Agent, or Firm—Roger A. Fields

[57] ABSTRACT

A disk cartridge includes a protective envelope located within the cartridge housing for enclosing a magnetic disk. the envelope prevents dust and other contaminants from reaching the disk surfaces and provides a rigid interior enclosure for the flexible disk, which supplements the housing in protecting the flexible disk from being folded or otherwise damaged. Loading the cartridge in a disk recording and/or playback apparatus actuates means in the cartridge for rotating the envelope within the housing to position a head-access opening and a backer-access opening in the envelope substantially in registration with corresponding openings in the housing. Removal of the cartridge from the apparatus causes the envelope to be rotated to position the envelope across the respective openings in the housing.

6 Claims, 4 Drawing Figures

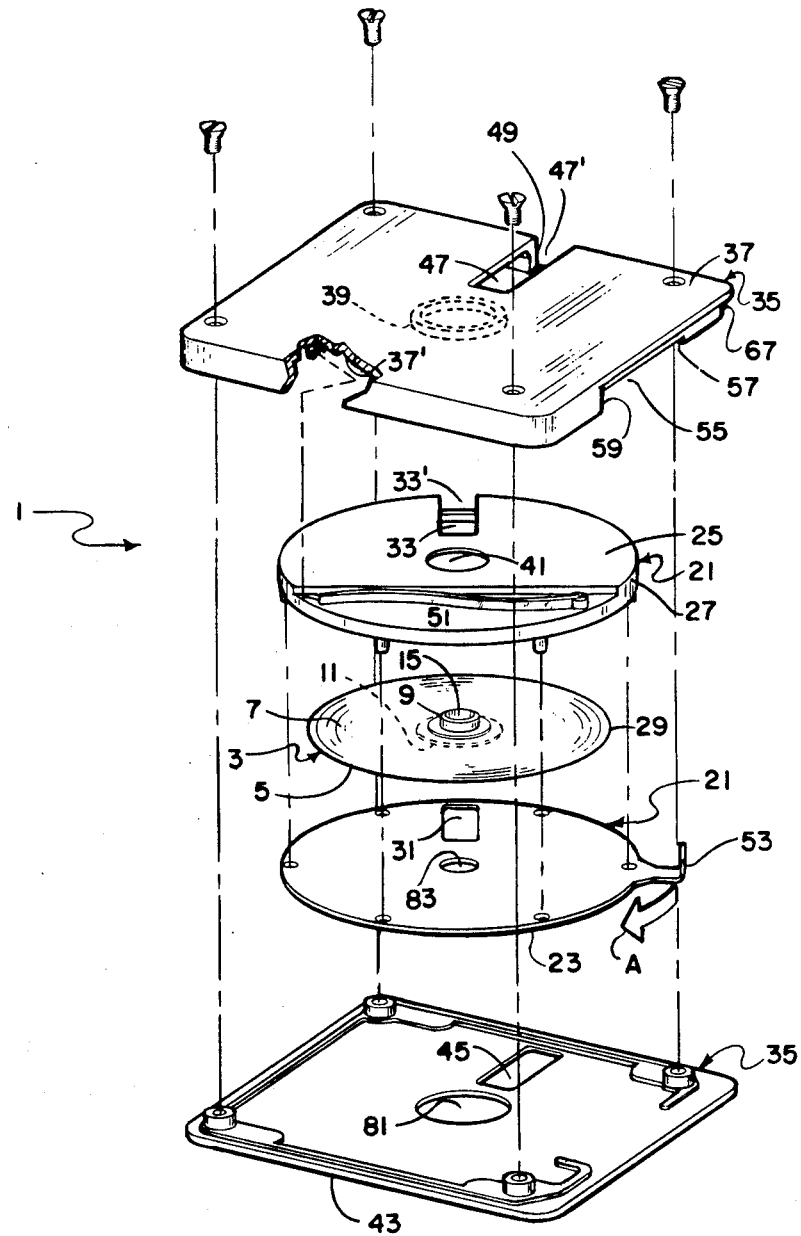
FIG. I

MAGNETIC DISK CARTRIDGE

BACKGROUND OF THE INVENTION

1. Field of the Invention

The invention generally relates to cartridges for magnetic disks on which information may be recorded in concentric or spiral tracks. More particularly, the invention relates to an improved cartridge for protecting one or more recording surfaces on the disk from dust and other contaminants.

2. Description of the Prior Art

Magnetic disks have been used for a number of years to record information in various types of devices, such as word processors and computer systems. Typically, such disks, sometimes referred to as "floppy disks" because of their lack of stiffness, are housed in a cartridge to prevent the flexible disk from being folded or otherwise seriously damaged and to protect the sensitive magnetic surface(s) of the disk from dust, fingerprints, and other contaminants. The perspiration or grease left by fingerprints on a magnetic surface of the disk will reduce the amplitude of the information signals, recorded on or read from the magnetic surface, by providing an intervening medium between the disk surface and the magnetic head. Dust and other airborne debris settling on the magnetic surface can cause surface scratches and will hasten wear of the magnetic head. All of this, of course, reduces the effectiveness and the life of the disk and the head.

Many of the disk cartridges that are generally available have at least one access opening through which a magnetic head can be received to record or read information on a magnetic surface of the disk. When using such a cartridge, however, dust as well as fingerprints can reach the magnetic surface through the access opening. To prevent this from happening, a shutter or a cover door is usually included, such as shown in U.S. Pat. Nos. 4,120,012 and 4,188,650. The cover door is normally positioned across the access opening to close the opening, but can be retracted from the opening to permit head access to the magnetic surface.

While cover doors, such as those shown in the '012 and '650 patents, provide some measure of protection for a magnetic surface of the disk in the vicinity of an access opening in the cartridge, they do not appear to provide sufficient protection from dust and other granular contaminants, which can enter through other openings in the cartridge or atop the cover door as it is opened. For example, dust may enter one or more central openings in the cartridge for receiving a drive spindle to rotate the disk. Since the cover door is spaced from a magnetic surface of the disk and does not enclose the disk, the dust will likely flow onto the magnetic surface.

SUMMARY OF THE INVENTION

The above-described problems regarding the protection of a magnetic surface of a disk from dust and other contaminants are believed solved by the invention. According to the invention, there is provided an improved cartridge that includes unitary means within the cartridge housing for substantially enclosing the disk to minimize the possibility of dust and other contaminants reaching the magnetic surface.

Specifically, the cartridge comprises:

a magnetic disk having opposite planar surfaces (one or more of which is magnetic) and a circumferential edge;

a rigid protective envelope including opposite face walls covering the respective planar surfaces of the disk and a substantially continuous side wall extending about the circumferential edge of the disk to surround the disk, at least one of the face walls having an opening to provide limited access to one of the planar surfaces of the disk;

a rigid housing enclosing the envelope, the housing having an opening to provide access to a planar surface of the disk through the opening in a face wall of the envelope; and means for rotating the envelope relative to the housing, in one direction to position the opening in a face wall of the envelope substantially in registration with the opening in the housing, and in a reverse direction to position the face wall across the opening in the housing.

In a preferred embodiment of the invention, the protective envelope is circular-shaped and has a diameter larger than that of the magnetic disk, and its side wall connects its opposite face walls to enclose the disk. Accordingly, the envelope, in addition to shielding the disk surfaces from dust and other contaminants, provides a rigid interior enclosure for the flexible disk, which supplements the cartridge housing in protecting the disk from being crumpled or otherwise seriously damaged.

BRIEF DESCRIPTION OF THE DRAWINGS

The invention will be described with respect to the drawings, wherein:

FIG. 1 is an exploded perspective view of a magnetic disk cartridge according to a preferred embodiment of the invention;

DESCRIPTION OF THE PREFERRED EMBODIMENT

Figure 3:
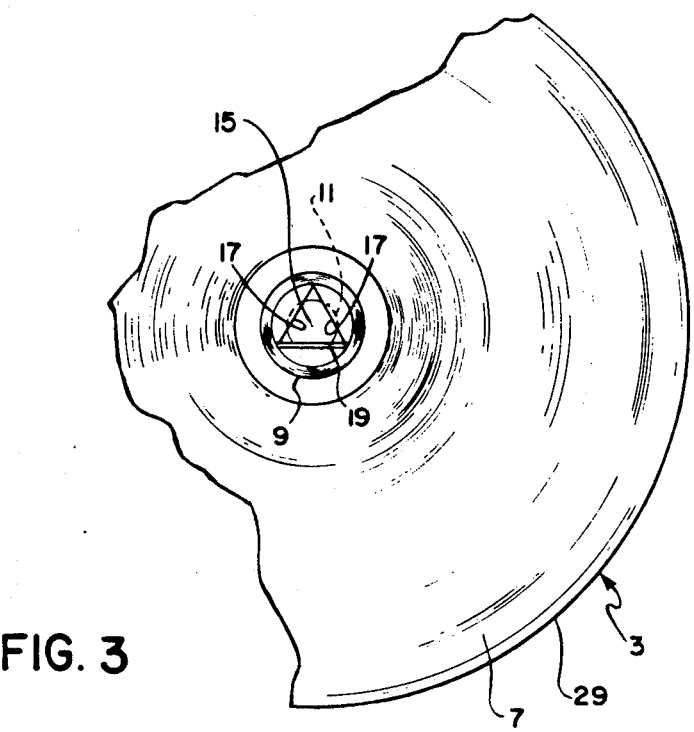
FIG. 3 is a plan view of the hub configuration of the magnetic disk.
Figure 2:
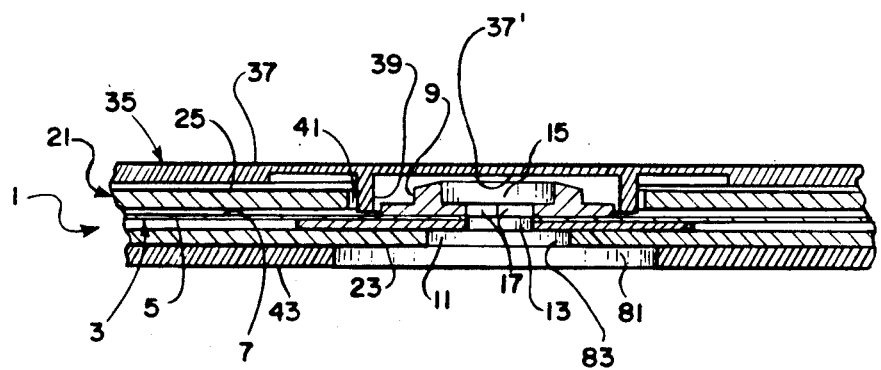
FIG. 2 is a partial sectional view of a central portion of the disk cartridge.

Referring now to the drawings, FIGS. 1 and 2 show a magnetic disk cartridge 1 intended for use in a disk recording and/or playback apparatus. The cartridge 1 includes a flexible disk 3 having a planar magnetic-coated surface 5, for recording and playback, and a planar support surface 7. A rotation hub 9 and an annular element 11, coaxially arranged with respect to a central hole 13 in the disk 3, are fixed to the respective planar surfaces 7 and 5 of the disk, as shown in FIG. 2. The hub 9 has a hole 15 for receiving a drive shaft in the recording and/or playback apparatus to rotate the disk 3. A pair of angled positioning edges 17, shown in FIG. 3, are arranged within the hole 15 to tangentially contact the circular periphery of the drive shaft for centering the disk 3 relative to the axis of the drive shaft. A resilient chordal element 19 extends across the hole 15, opposite the two positioning edges 17, to hold the drive shaft firmly against both of the positioning edges.

A rigid protective envelope 21 is provided to enclose the disk 3 in a cylindrically-shaped chamber, though the envelope is dimensioned to allow the disk to freely rotate within the chamber. As shown in FIGS. 1 and 2, the envelope 21 includes a pair of substantially parallel, circular-shaped face walls 23 and 25, each having a similar size diameter, which is slightly larger than the diameter of the disk 3. The two face walls 23 and 25 generally cover the respective surfaces 5 and 7 of the disk 3, but they are slightly spaced from such surfaces. A substantially continuous side wall 27 of the envelope 21, encircling the circumferential edge 29 of the disk 3, connects the face walls 23 and 25, as shown in FIG. 1. The face walls 23 and 25 have respective openings 31 and 33, which are aligned in a radial sense relative to the disk 3 to provide limited access to its magnetic and support surfaces 5 and 7, for example, for a magnetic head and a back-up plate in the recording and/or playback apparatus. The access opening 31 to the magnetic surface 5 radially extends lengthwise to separate locations opposite the inner and outer effective limits of the annular recording area on the magnetic surface. The access opening 33 to the support surface 7 extends inwardly the same distance as the access opening 31, but extends outwardly a greater distance to the side wall 27 of the envelope 21, forming an opening 33' in the side wall.

A rigid rectangular-shaped housing 35 encloses the envelope 21 and is dimensioned to allow the envelope to rotate within the housing. As viewed in FIGS. 1 and 2, a top wall 37 of the housing 35 includes, on its inside surface 37', an integrally-formed, centered, tubular-like member 39. The tubular-like member 39 extends into a central opening 41 in the face wall 25 of the envelope 21 to support the envelope for rotation relative to the housing 35 substantially about the same axis as that of the disk 3. The rotation hub 9 of the disk 3 is located within the tubular-like member 39 to loosely support the disk for rotation.

A bottom wall 43 of the housing 35 and the top wall 37 of the housing, as viewed in FIG. 1, have respective openings 45 and 47, which are normally out of registration with the access openings 31 and 33 in the face walls 23 and 25 of the envelope 21 in order to be closed by the face walls. The respective openings 45 and 47 correspond substantially in size and arrangement to the access openings 31 and 33. For example, the opening 47 in the top wall 37 of the housing 35 forms an opening 47' in a side wall 49 of the housing 35, in the same way that the access opening 33 in the face wall 25 of the envelope 21 forms the opening 33' in the side wall 27 of the envelope. A return spring 51 has one end fixed to the face wall 25 of the envelope 21 and another end fixed to the inside surface 37' of the top wall 37 of the housing 35. A tab 53, integrally formed with the face wall 23 of the envelope 21, extends through a side slot 55 in the housing 35. The spring 51 ordinarily maintains the access openings 31 and 33 (33') in the envelope 21 displaced from the respective openings 45 and 47 (47') in the housing 35 by urging the envelope to rotate in a direction opposite to that indicated by the arrow A until the tab 53 is abutted against a stop 57 at one end of the side slot 55. When the tab 53 is moved in the direction of the arrow A until it abuts against a stop 59 at the other end of the side slot 55, the envelope 21 will be rotated in the same direction to position the access openings 31 and 33 (33') substantially in registration with the respective openings 45 and 47 (47'). Then, a magnetic head and a back-up plate, for example, may be admitted through such registered openings to the magnetic and support surfaces 5 and 7 of the disk 3.

Accordingly, there has been described an improved disk cartridge 1 that includes an envelope 21 within a housing 35 for twice enclosing a magnetic disk 3 to prevent dust and other contaminants from reaching a sensitive magnetic surface 5 of the disk. The envelope, in addition to shielding the magnetic surface of the disk from dust, provides a rigid interior enclosure for the disk, which supplements the rigid housing in protecting the fragile disk from being folded or otherwise damaged.

OPERATION

Figure 4:
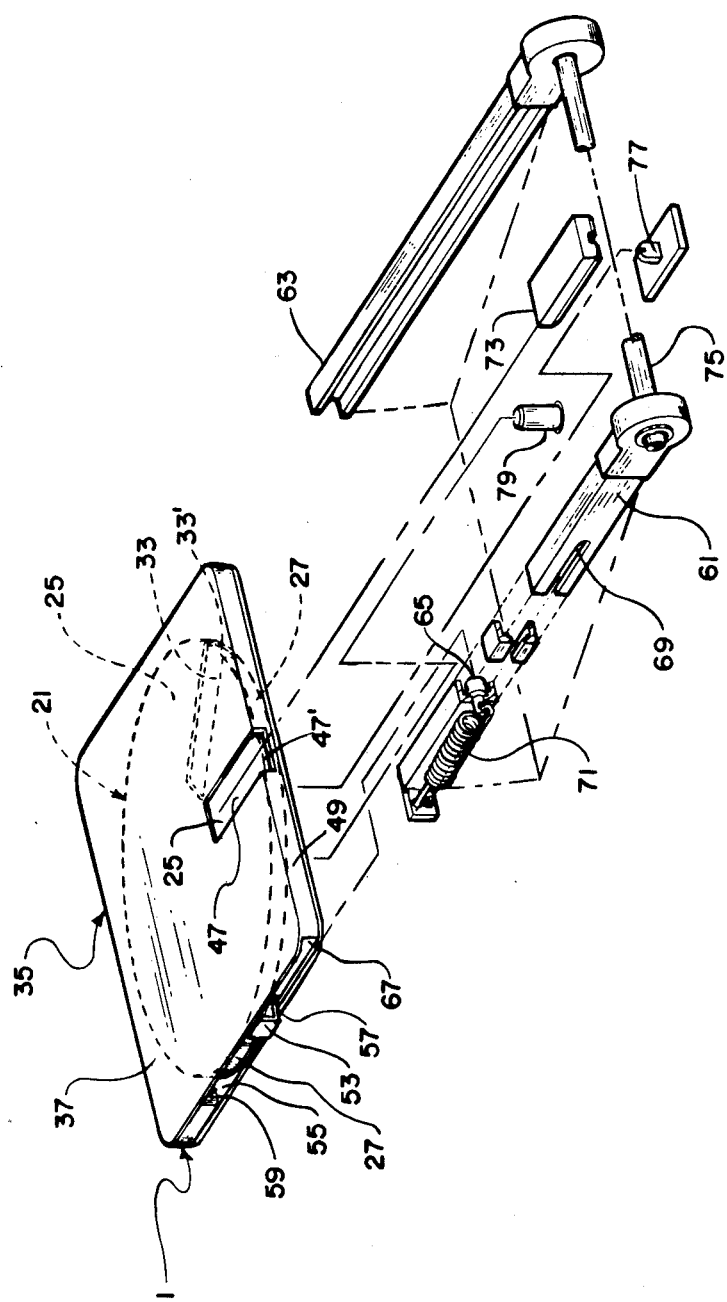
FIG. 4 is a schematic perspective view of the disk cartridge and a cartridge-loading assembly in a disk recording and/or playback apparatus.

FIG. 4 shows the manner in which the disk cartridge 1 may be inserted in a cartridge-loading assembly of a disk recording and/or playback apparatus. When the cartridge 1 is slid into a pair of substantially parallel, u-shaped channels 61 and 63, a boss 65, located on the inside surface of the channel 61, will first enter a guide groove 67 in the housing 35 and will then swing the tab 53 along the side slot 55 in the housing from the stop 57 to the stop 59. Thereupon, the envelope 21 will be rotated relative to the housing 35 to position the access openings 31 and 33 (33') in the envelope substantially in registration with the respective openings 45 and 47 (47') in the housing. With continued movement of the cartridge 1 in the channels 61 and 63, the tab 53 (against the stop 59) will depress the boss 65 along a support slot 69 in opposition to the urging of a return spring 71. Then, final movement of the cartridge 1 in the channels 61 and 63 will cause a back-up plate 73, fixed with the channels to the underside of a case cover, not shown, to be radially received, through the registered openings 47' and 33', into the registered openings 47 and 33. Releasable means, not shown, may be provided for securing the cartridge in place.

When the case cover with the cartridge 1 secured in place is pressed downward, as viewed in FIG. 4, it will pivot about a supporting rod 75 until the cartridge comes to rest atop a base plate, not shown. As the case cover is pressed downward, a magnetic head 77 movably supported on the base plate will be inserted into the registered openings 31 and 45, and a drive spindle 79 projecting from an opening in the base plate will be inserted into the hole 15 in the hub 9 of the disk 3. As shown in FIG. 1, the bottom wall 43 of the housing 35 and the face wall 23 of the envelope 21 have respective central openings 81 and 83 for admitting the drive spindle 79 to the hole 15 in the hub 9.

The invention has been described in detail with reference to a preferred embodiment, but it will be understood that variations and modifications can be effected within the spirit and scope of the invention. For example, the access opening 31 in the face wall 23 of the envelope 21 could be extended through the side wall 27 of the envelope and the access opening 45 in the bottom wall 43 of the housing 35 could be extended through the side wall 49 of the housing, in the same way that the access openings 33 and 47 form openings 33' and 47' in the respective side walls. With such an arrangement, the magnetic head 77 as well as the back-up plate 73 could be radially received through the registered openings.

In the cartridge-loading assembly, the boss 65 may be fixed to the channel 61, rather than movable along the slot 69 in the channel. To accommodate such a modification, the length of the side slot 55 in the housing 35 of the cartridge 1 and the width of the access openings 31 and 33 (33') in the envelope 21 of the cartridge would be enlarged.

I claim:

1. A magnetic disk cartridge, comprising:
   a flexible magnetic disk having opposite planar surfaces and a circumferential edge;
   a ridge protective envelope including opposite face walls covering the respective planar surfaces of said disk and a substantially continuous side wall extending about the circumferential edge of said disk to provide a ridge enclosure for the disk, at least one of said face walls having an opening for limited access to one of the planar surfaces of said disk;
   a rigid housing enclosing said envelope, said housing having an opening for access to a planar surface of said disk through said opening in a face wall of said envelope; and
   means for rotating said envelope relative to said housing, selectively, to position said opening in a face wall of said envelope substantially in registration with said opening in said housing, and to position the face wall across said opening in said housing.

2. A magnetic disk cartridge as recited in claim 1, wherein said envelope is circular-shaped and has a diameter larger than that of said disk.

3. A magnetic disk cartridge, comprising:
   a flexible magnetic disk having opposite planar surfaces and a circumferential edge;
   means supporting said disk for rotation about an axis;
   a rigid portective envelope including circular-shaped face walls covering the respective planar surfaces of said disk, through having a diameter larger than that of the disk, and a substantially continuous side wall connecting said face walls to encircle the circumferential edge of said disk, at least one of said face walls having an opening to provide limited access to one of the planar surfaces of said disk;
   a rigid housing enclosing said envelope, said housing having an opening to provide access to a planar surface of said disk through said opening in a face wall of said envelope; and
   means for rotating said envelope coaxially with respect to said disk and relative to said housing, in one direction to position said opening in a face wall of said envelope substantially in registration with said opening in said housing, and in a reverse direction to position the face wall across said opening in said housing.

4. A magnetic disk cartridge, comprising:
   a flexible magnetic disk having opposite planar surfaces;
   rigid unitary means defining a rigid cylindrically-shaped enclosure for said disk, said unitary means having respective openings into the enclosure to provide limited access to the planar surfaces of said disk;
   a rigid housing enclosing said unitary means, said housing having respective openings to provide access to the planar surfaces of said disk through said openings into said enclosure; and
   means, intergral with said housing, supporting said unitary means for rotation relative to said housing, in one direction to position said openings into the enclosure substantially in registration with said openings in said housing, and in a reverse direction to position said enclosure openings out of registration with said housing openings.

5. A magnetic disk cartridge as recited in claim 4, wherein said unitary means has a central opening, and said supporting means includes a tubular-like member located in said central opening to support said unitary means for rotation relative to said housing.

6. A magnetic disk cartridge as recited in claim 5, wherein a hub located at the center of said magnetic disk extends into said tubular-like member.

* * * * *

UNITED STATES PATENT OFFICE
CERTIFICATE OF CORRECTION

PATENT NO. : 4,471,397
DATED : September 11, 1984
INVENTOR(S) : Robert P. Lourtier It is certified that error appears in the above-identified patent and that said Letters Patent are hereby corrected as shown below:

ABSTRACT, line 3      After "disk." change "the" to -- The --.

Col. 5, line 5
Claim 1      After the word "a" delete the word "ridge" and insert therefor -- rigid --.

Col. 5, line 9
Claim 1      After the word "a" delete the word "ridge" and insert therefor -- rigid --.

Col. 5, line 31
Claim 3      After the word "disk," delete the word "through" and insert therefor -- though --.

Signed and Sealed this

Nineteenth Day of February 1985

[SEAL]

Attest:

DONALD J. QUIGG

Attesting Officer     Acting Commissioner of Patents and Trademarks